United States Patent [19]
Tsujimura et al.

[11] Patent Number: 5,308,678
[45] Date of Patent: May 3, 1994

[54] TRIM BOARD

[75] Inventors: Teruo Tsujimura; Mineo Kato, both of Gifu; Hidehito Hashimoto, Aichi, all of Japan

[73] Assignee: Ikeda Bussan Co., Ltd., Ayase, Japan

[21] Appl. No.: 957,765

[22] Filed: Oct. 15, 1992

[30] Foreign Application Priority Data

Oct. 16, 1991 [JP] Japan .................. 3-298350

[51] Int. Cl.$^5$ .................................................. B32B 3/28
[52] U.S. Cl. .................................. 428/182; 428/174; 428/178; 428/246; 428/282; 428/306.6; 264/241; 264/257; 264/319; 264/324; 156/196; 156/242; 296/214
[58] Field of Search ............... 428/167, 182, 184, 174, 428/178, 187, 219, 245, 246, 280, 282, 304.4, 306.6, 340, 68, 71, 76; 296/214; 264/505, 531, 241, 257, 285, 319, 324; 156/60, 196, 242

[56] References Cited

U.S. PATENT DOCUMENTS 5,079,067  1/1992  Willging ........................ 428/182

*Primary Examiner*—Donald J. Loney
*Attorney, Agent, or Firm*—Foley & Lardner

[57] ABSTRACT

A trim board structure which is used for an interior lining, for example, of a ceiling member or a door member of a motor vehicle includes a base member, an inner trim member which is to be exposed, and a cushioning member which is interposed between the base member and the inner trim member. The base member is made of a corrugated cardboard sheet impregnated with resorcinol resin. Due to usage of resorcinol resin, the trim board structure can be molded at a relatively low temperature.

10 Claims, 1 Drawing Sheet

TRIM BOARD

BACKGROUND OF THE INVENTION

1. Field of the Invention

The present invention relates in general to a trim board structure, and more particularly to a trim board structure used for an interior lining, for example, of a ceiling member or a door member of a motor vehicle.

2. Description of the Prior Art

Hitherto, various types of trim board structures have been proposed as an interior lining of a motor vehicle. A trim board structure comprises a base member and an inner trim member which is exposed and stuck on the base member. For example, as the base member of the trim board structure, a corrugated cardboard sheet impregnated with phenolic resin has been proposed. However, it has the following drawbacks.

It is necessary to cure phenolic resin at a relatively high temperature such as about 200° C. With this high-temperature cure, the quality of the corrugated cardboard sheet tends to deteriorate. Furthermore, it is difficult to stick a non heat-resistive inner trim member on the corrugated cardboard sheet impregnated with phenolic resin and to cure this phenolic resin, because the inner trim member does not resist the high temperature and tends to deteriorate upon cure. Still furthermore, phenolic resin is unsatisfactory in water resisting property and flexibility.

SUMMARY OF THE INVENTION

It is therefore an object of the present invention to provide a base member of a trim board structure, which can be molded at a relatively low temperature as compared with another base member impregnated with phenolic resin.

It is another object of the present invention to provide a base member impregnated with a resin which is superior in water resisting property and flexibility.

According to the present invention, there is provided a trim board structure including: a corrugated cardboard sheet impregnated with a resorcinol resin.

DETAILED DESCRIPTION OF THE INVENTION

According to the present invention, there is provided a trim board structure, which is used as an interior lining, for example, of a ceiling member or a door member of a motor vehicle.

The trim board structure comprises a base member and an inner trim member which is exposed and stuck on the base member.

The base member according to the present invention is a corrugated cardboard sheet impregnated with resorcinol resin. Resorcinol resin used in the present invention is a condensation product of a resorcinol compound such as resorcinol or alkylresorcinol and formaldehyde.

To impregnate the corrugated cardboard sheet with resorcinol resin, a resorcinol resin solution is applied to one or both surfaces of the corrugated cardboard sheet, or the corrugated cardboard sheet is soaked in the resorcinol resin solution. It is usual to use resorcinol resin solution at the rate of 30 to 40 g (expressed as resin) per 1 m² of one major surface of the corrugated cardboard sheet, or 60 to 80 g per 1 m² of the corrugated cardboard sheet when both major surfaces are coated.

As the inner trim member, it is usual to use a nonwoven fabric of a synthetic fiber such as polypropylene fiber, polyester fiber, polyamide fiber, acrylic fiber or acetate fiber, a fibrous trim material such as piled fabric, a plastic sheet such as a polyvinyl chloride sheet or a polyamide sheet, and a plastic trim member such as a laminated sheet of the plastic sheet and a foamed plastic sheet such as a foamed polyurethane sheet.

Upon molding, the corrugated cardboard sheet tends to have cracks, creases and the like at its deep drawn portion. This makes the exposed surface of the inner trim member uneven in shape, thereby deteriorating the external appearance thereof. To prevent this, it is desirable to interpose a cushioning member between the base member and the inner trim member. As the cushioning member, it is usual to use foamed polyurethane, felt or the like. It is desirable to impregnate the cushioning member with resorcinol resin as well as the corrugated cardboard sheet.

The cushioning member is stuck on the corrugated cardboard sheet by means of, for example, a hot-melt adhesive. However, if desired, the cushioning member may be stuck on the cardboard sheet by means of resorcinol resin itself with which the cushioning member is impregnated. Similarly, the inner trim member is stuck on the cushioning member by means of, for example, a hot-melt adhesive. However, if desired, the inner trim member may be stuck on the cushioning member by means of the resorcinol resin itself with which the cushioning member is impregnated.

Resorcinol resin can be cured at a relatively low temperature ranging from 130° to 150° C. Therefore, the trim board structure according to the present invention can be molded at a temperature below 150° C. Furthermore, it should be noted that resorcinol resin is superior in water resisting property and flexibility as compared with phenolic resin.

Figure 1:
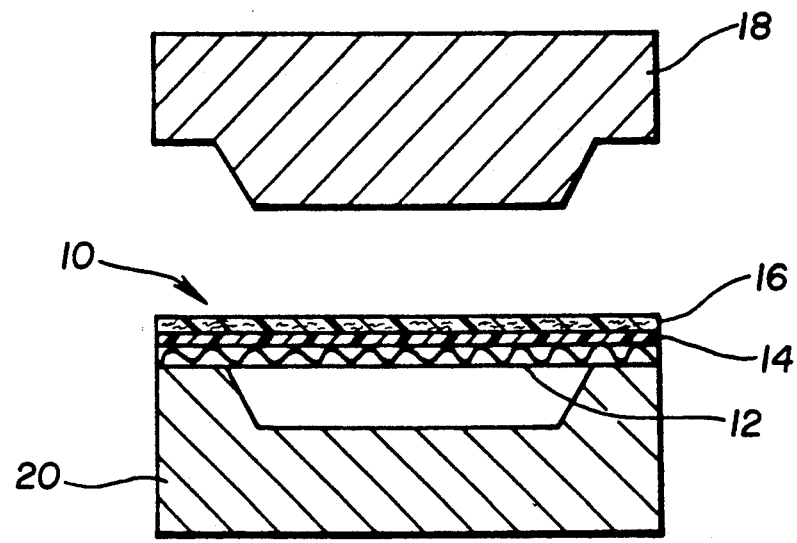
FIG. 1 is a sectional view, showing a trim board structure to be molded by a press machine.
Figure 2:
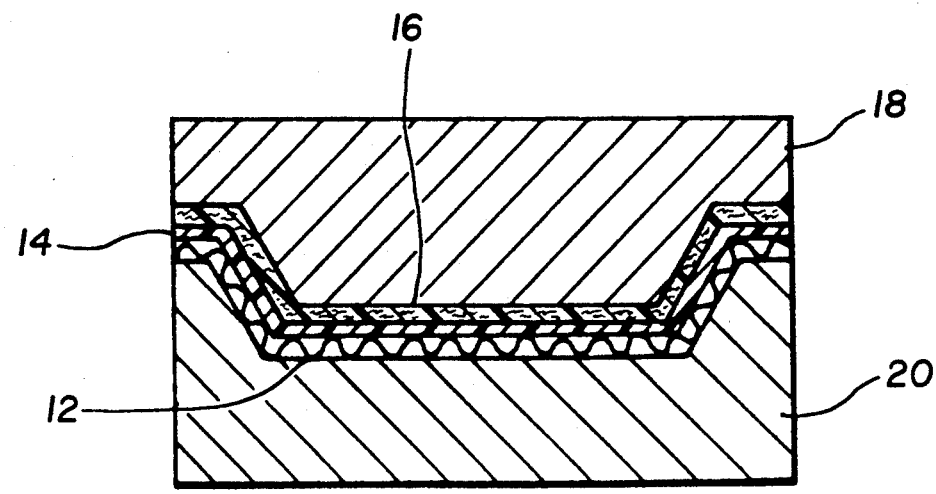
FIG. 2 is a view similar to FIG. 1, but showing the trim board structure molded by the press machine.

Referring to FIGS. 1 and 2, a method of preparing a trim board structure 10 and molding the same in accordance with the present invention will be described in the following.

First, 50 wt % 5-methylresorcinol resin solution is applied on both surfaces of a corrugated cardboard sheet or a base member 12 through a roll coater at the rate of 36 g per 1 m² of each major surface of the sheet. Then, it is air-dried.

A polyurethane sheet (3 mm thickness and 0.017 specific gravity) is impregnated with the methylresorcinol resin solution at the drawing rate of 100%. Then, it is air-dried.

Then, as is seen from FIG. 1, the polyurethane sheet impregnated with the resorcinol resin as the cushioning member 14 is stuck on the corrugated cardboard sheet impregnated with the resorcinol resin 12. Then, a nonwoven fabric of polypropylene fiber as the inner trim member 16 is stuck on the cushioning member 14 so as to prepare the trim board structure 10.

Then, the trim board structure 10 is set between upper and lower molds 18, 20 of a press machine heated at a temperature of 140° C., and molded into the form of an inner lining of a ceiling member of a motor vehicle with a pressure of 3 kg/cm² for 2 min. After the molding the trim board structure 10 is, for example, trimmed and pierced so as to prepare the inner lining.

The advantage of the trim board structure of the present invention will be described in the following.

Due to usage of resorcinol resin, the trim board structure according to the present invention can be molded at a relatively low temperature. Therefore, a non heat-resistive inner trim member can be used to be molded with the base member and the cushioning member.

What is claimed is:

1. A trim board structure comprising:
   a corrugated cardboard sheet impregnated with a resorcinol resin;
   an inner trim member having inner and outer surfaces; and
   a cushioning member disposed between one side of said impregnated corrugated sheet and the inner surface of said inner trim member.

2. A trim board structure according to claim 1, wherein said cushioning member is selected from the group consisting of a foamed polyurethane and a felt.

3. A trim board structure according to claim 1, wherein said corrugated cardboard sheet is impregnated with said resorcinol resin at the rate of 60 to 80 g of said resorcinol resin per 1 m² of said corrugated cardboard sheet.

4. A trim board structure comprising:
   a corrugated cardboard sheet impregnated with a resorcinol resin;
   an inner trim member having inner and outer surfaces;
   a cushioning member disposed between one side of said impregnated corrugated cardboard sheet and the inner surface of said inner trim member, said cushioning member being impregnated with a resorcinol resin.

5. A trim board structure according to claim 4, wherein said cushioning member is selected from the group consisting of a foamed polyurethane and a felt.

6. A method for preparing a trim board structure for use as an interior lining of a motor vehicle, said method comprising the steps of:
   a) impregnating a corrugated cardboard sheet with a resorcinol resin;
   b) adhering an inside surface of a cushioning member to one side of said impregnated corrugated cardboard sheet;
   c) adhering an inside surface of an inner trim member to an outer surface of said cushioning member so that said cushioning member is disposed between said impregnated corrugated cardboard sheet and the inside surface of said inner trim;
   d) molding, in a conformal manner, said corrugated cardboard sheet, said cushioning member, and said inner trim member.

7. A method according to claim 6, wherein said molding step comprises the steps of
   d1) shaping, in a conformal manner, said corrugated cardboard sheet, said cushioning member and said inner trim member;
   d2) heating said conformally shaped elements at a temperature of about 140° C.

8. A method according to claim 6, wherein said corrugated cardboard sheet is impregnated with a 50 wt 5-methylresorcinol resin solution at a rate of about 30 to about 40 g per 1 m².

9. A method according to claim 6, further comprising the step of impregnating said cushioning member with a resorcinol resin.

10. A method according to claim 9, wherein said cushioning member is adhered to said impregnated corrugated cardboard sheet by means of the resorcinol used to impregnate said cushioning member and said corrugated cardboard sheet.

* * * * *